United States Patent [19]

Tighe

[11] Patent Number: 5,618,155

[45] Date of Patent: Apr. 8, 1997

[54] CONSTRUCTION SITE HAULING SYSTEM

[76] Inventor: Peter Tighe, 22 Timmins Rd., Bow, N.H. 03304

[21] Appl. No.: 287,131

[22] Filed: Aug. 8, 1994

Related U.S. Application Data

[63] Continuation-in-part of Ser. No. 986,851, Dec. 4, 1992, Pat. No. 5,335,930.

[51] Int. Cl.$^6$ ........................................................ E02F 3/00
[52] U.S. Cl. ........................... 414/680; 280/504; 298/15; 298/20 R; 298/22 R; 414/912; 414/724
[58] Field of Search ............................ 414/680, 607, 414/722, 724, 912; 298/22 R, 20 R, 15; 280/515, 504, 493

[56] References Cited

U.S. PATENT DOCUMENTS

| | | | |
|---|---|---|---|
| 3,421,642 | 1/1969 | Carter | 414/724 |
| 3,734,539 | 5/1973 | Salmi | 280/477 |
| 3,765,703 | 10/1973 | Voelkerding et al. | 280/475 |
| 3,858,939 | 1/1975 | Bond et al. | |
| 3,976,284 | 8/1976 | Hupp | 259/168 |
| 4,113,274 | 9/1978 | Vahrenkamp | 280/475 |
| 4,133,552 | 1/1979 | Sheine | 280/446 |
| 4,253,680 | 3/1981 | Albright et al. | 280/479 |
| 4,288,091 | 9/1981 | Umeda et al. | 280/515 X |
| 4,313,264 | 2/1982 | Miller, Sr. | 33/264 |
| 4,495,717 | 1/1985 | Lockwood | 414/724 X |
| 4,560,183 | 12/1985 | Cook | 280/477 |
| 4,666,176 | 5/1987 | Sand | 280/477 |
| 4,674,942 | 6/1987 | Assh et al. | 414/483 |
| 4,723,788 | 2/1988 | Suter | 280/477 |
| 4,863,184 | 9/1989 | Mena | 280/763.1 |
| 4,898,400 | 2/1990 | Elkins | 280/475 |
| 4,958,978 | 9/1990 | Shedleski | 280/433 |
| 5,097,609 | 3/1992 | Swaggert | 414/607 X |
| 5,263,745 | 11/1993 | Storey | 280/493 X |

FOREIGN PATENT DOCUMENTS

| | | | |
|---|---|---|---|
| 238152 | 1/1961 | Australia | 298/20 R |
| 77338 | 10/1948 | Norway | 298/20 R |

OTHER PUBLICATIONS

Caterpillar, Inc. Catalog, "Caterpillar Product Line" (Mar. 1988).

*Primary Examiner*—Donald W. Underwood
*Attorney, Agent, or Firm*—Peter J. Manus

[57] ABSTRACT

A hauling system for loose bulk material at a construction site uses a self-propelled vehicle and a trailer that is not self-propelled which are releasably connected by a system that is operable by a single operator who aligns, connects, locks, unlocks and disconnects the self-propelled vehicle and the trailer, preferably without leaving the cab of the self-propelled vehicle. A hook secured on a tool of the self-propelled vehicle and a ring secured, directly or indirectly, to the trailer, releasably connect them. Rotation of the tool, e.g. the bucket of a wheel loader, locks and unlocks the coupling. The operator of the self-propelled vehicle has direct visible sight of the coupling. The ring can be mounted at the end of an articulated frame pivotally connected to a hydraulic jack cylinder. A dump body of the trailer can be raised by a hoist piston. Vertical reciprocation of the tool pumps the jack cylinder which produces hydraulic power to activate the hoist cylinder via a valve body. In another form the trailer mounts a track at its front end which is curved to cam the trailer up at its front end when a moveable carriage is driven along the track by the wheel loader via hook and ring couplers. A lock pin on the carriage secures it for connection and travel.

4 Claims, 5 Drawing Sheets

CONSTRUCTION SITE HAULING SYSTEM

REFERENCE TO RELATED APPLICATIONS

This application is a continuation-in-part of U.S. application Ser. No. 07/986,851, filed Dec. 4, 1992, now U.S. Pat. No. 5,335,930, issued Aug. 9, 1994.

BACKGROUND OF THE INVENTION

This invention relates to hauling systems, and more specifically to systems for hauling loose bulk material at a construction site using a self-propelled vehicle ordinarily found on the site and a drawn trailer.

At almost every construction site it is necessary to move construction materials, gravel, dirt, and like loose bulk material. Currently at most construction sites special hauling vehicles, such as self-propelled dump trucks, are used in excavation to complement a front wheel loader or steam shovel that lifts and loads dirt and debris into the truck. These solutions work well, but require the extra capital and operating costs of the dump truck and its driver in addition to the wheel loader or steam shovel and its operator.

While in general a wide variety of hauling systems are well known, such as railroad trains, light pickup trucks, tractor trailer trucks, and sophisticated refuse pick up and hauling trucks, most are not suited to use at a construction site. Railroads require rails. Few construction projects warrant the construction of special rail lines. Ordinary highway vehicles are built to haul loads for long distances over comparatively smooth, hard-surfaced highways. The suspensions, trailer attachment arrangements, weight distribution and general ruggedness of highway tractor-trailers are not well suited to the harsh and uneven terrain of a construction site. Pickup trucks are not sufficiently rugged and do not have the necessary carrying capacity for construction site hauling. Hence the frequent use of self-propelled, heavy-duty dump trucks and dumpsters, despite their cost and other drawbacks.

In hauling systems involving a self-propelled vehicle (a "tractor") and a drawn (non self-propelled) trailer, the tractor and the trailer must connect and disconnect, and ideally should do so reliably and with relative ease. In existing hauling systems, it is sometimes necessary for the operator of the tractor to rely on an observer to direct the tractor into alignment with the trailer so that the two vehicles can be connected. Even where some form of alignment mechanism visible from the cab of the tractor permits the operator to align the vehicles alone, as in U.S. Pat. No. 4,313,264 to Miller; U.S. Pat. No. 4,723,788 to Suter; or U.S. Pat. No. 4,666,176 to Sand, it is generally necessary for the operator to exit from the tractor in order to physically connect the tractor to the trailer. In those systems that permit the vehicles to be connected without the operator exiting from the tractor, e.g. U.S. Pat. No. 4,560,183 to Cook, the operator must still exit from the tractor to dismantle the connecting mechanism once the vehicles are connected. This is necessary in order to permit complete freedom of movement of the tractor and trailer in combination.

Another deficiency in existing hauling systems, such as the one described in Cook, is that they will not function if the rear of the tractor and front of the trailer are out of vertical alignment. While this may be a manageable problem for conventional highway vehicles that are assembled on comparatively flat, hard surfaces such as concrete or asphalt parking areas, it is a more difficult problem when tractor and trailer are to be coupled on uneven, varying terrain such as usually found on a construction site. This problem is accentuated where the trailer can tip over, as is usually the case with a drawn trailer when it is usually designed to have a net downward force at the front end of the trailer during travel. Weight distribution even further accelerates the problem. Where a heavy load is added in batches or where the center of gravity of the loaded vehicle can vary greatly depending on the weight distribution of the load, the force acting on a "land" or jack or the like under the front end of the trailer to hold it horizontal when at rest and detached can vary greatly. If the ground is not paved or otherwise very firm, the weight of the load can cause one end of the trailer to sink into the ground as the trailer is loaded, or to sink in over time once it is loaded. A viable trailer hauling system for a construction site must therefore deal with variation in the height of the trailer-to-tractor connection and changes in the height during use.

In other existing systems, such as that described in U.S. Pat. No. 4,133,552 to Sheine, in addition to requiring an operator to leave the tractor, the mechanism that permits the two vehicles to be connected requires extensive connections between the two vehicles that must be completed by the operator who leaves the cab of one vehicle, or a second individual. This is inconvenient and inefficient if the vehicles are to be connected and disconnected frequently, not to mention safety concerns to the operators moving around the site and working with heavily loaded equipment in a hazardous, uneven environment.

A further concern is that the vehicle carrying the load must be readily unloaded. The usual approach is to dump the load over an end wall of a dump body or through a hinged gate or flap mounted as or at the rear end wall. In the standard dump truck, hydraulic jacking one end of a load-carrying body slides the load out of a pivoted gate or over the end of a load-carrying body. In a conventional dump truck, the truck motor can power a hydraulic jack for the dumping operations. Highway tractor trailers with a dumping capability are known, but they are not well suited to operation at a construction site. They have a large turn radius, and they are comparatively long and narrow which makes them unstable on construction site terrain. It is therefore highly desirable to be able not only to readily connect a drawn trailer to a self-propelled vehicle without a second operation and with a secure connection during travel, but also to dump the load after travel and to do so with a minimum of extra capital cost.

It is therefore a principal object of this invention to provide a hauling system in which the usual functions of two separate vehicles, one to load and the other to haul and dump, are accomplished by a single operator.

It is also a principal object of this invention to provide a hauling system where a single operator connects and disconnects two vehicles without leaving the operating cab of one vehicle to align, connect, load, dump, or disconnect the second vehicle.

Another principal object of this invention is to provide a hauling system which uses a slightly modified self-propelled vehicle ordinarily found on a construction site as a propelling vehicle for the hauling thereby saving the capital and operating cost of two self-propelled vehicles.

Another object of this invention is to provide a hauling system with the foregoing advantages which allows a rapid and reliable connection of the trailer despite variations in the position of the connection due to the load, load shifts, variations in the terrain, or the sinking of one or both vehicles into the terrain.

A further object is to provide these advantages while also providing a dumping capability to unload a trailer, even where a load-carrying dump body is fixed on a trailer frame.

Yet another object of this invention is to provide a two-vehicle, one-operator hauling system in which two vehicles can be connected to one another and their operation controlled without electrical, hydraulic, or pneumatic lines connected between the vehicles.

SUMMARY OF THE INVENTION

A self-propelled construction site vehicle such as a wheel loader is releasably secured to a trailer that is not self-propelled. A connection system includes a part mounted on a movable and rotatable part of the wheel loader, preferably a tool such as a bucket that is pivotally mounted at the end of a lift arm or arms for the self-propelled vehicle. In a preferred embodiment, the connection system consists of a hook secured on the front wall of the bucket and a ring secured, directly or indirectly, to a forwardly extending portion of the frame of the trailer. The hook and ring are shaped and sized so that in a first angular position of the bucket the tip of the hook engages the ring. Rotation of the bucket to a second angular position then locks the engagement for travel and dumping. Alternatively, the hook can be mounted on the trailer and the ring can be mounted on the tractor. The hook preferably curves at least at its free end towards the wheel loader. The ring is oriented in a generally horizontal plane at least during the initial engagement. The hook and ring are directly visible by an operator of the wheel loader from its cab.

The hauling system also includes a lift mechanism or mechanisms to adjust the height the front end of the entire trailer with respect to the ground, and to dump the load over or through a hinged gate or door of, an end wall of the dump body. The power source for the lift mechanism includes the power source for the wheel loader which raises, lowers, and rotates the bucket. In one embodiment, the lift mechanism includes a hydraulic jack mounted on the trailer frame at the front end opposite the wheel loader bucket. Once coupled, a raising and lowering of the lift arms of the wheel loader pumps the jack via an articulated frame member that mounts the ring at its free end. The jack is pivotally connected between the frame member and fixed trailer frame. The trailer also includes a hydraulic cylinder to raise one end of a dump body from the frame to produce the dumping movement. The pumping of the jack, with the flow of pumped hydraulic fluid controlled by a hydraulic valve, drives the dump cylinder. The wheel loader therefore "jacks up" the trailer through the coupling.

In another form, the trailer has no jacks, lifts or hydraulics. A track extends toward the wheel loader and is curved in the vertical plane to elevate the ring with respect to the point of connection of the track to the dump body. A freely movable carriage that mounts the ring is releasably locked at the free end or neck of the track for connection to and travel with the wheel loader. A small battery powered motor or actuator releases and engages a lock pin carried on the carriage with respect to a mating opening in the neck of the track. The pin can also be fixed on the neck and engage a hole or the like in the carriage. When the pin is retracted, the carriage is free to roll along the track. Dumping is accomplished by raising the lift arms of the wheel loader and moving the wheel loader and trailer toward one another. This causes the carriage to travel along the track and thereby cam the dump body to a dumping position. A fixed stand at the front end of the trailer supports the front end during loading. A fixed stake at the rear end engages the ground as the trailer is raised to dump its contents.

These and other features and objects of the present invention will be more readily understood from the following detailed description which should be read in light of the accompanying drawings.

DETAILED DESCRIPTION OF THE PREFERRED EMBODIMENTS

Figure 1:
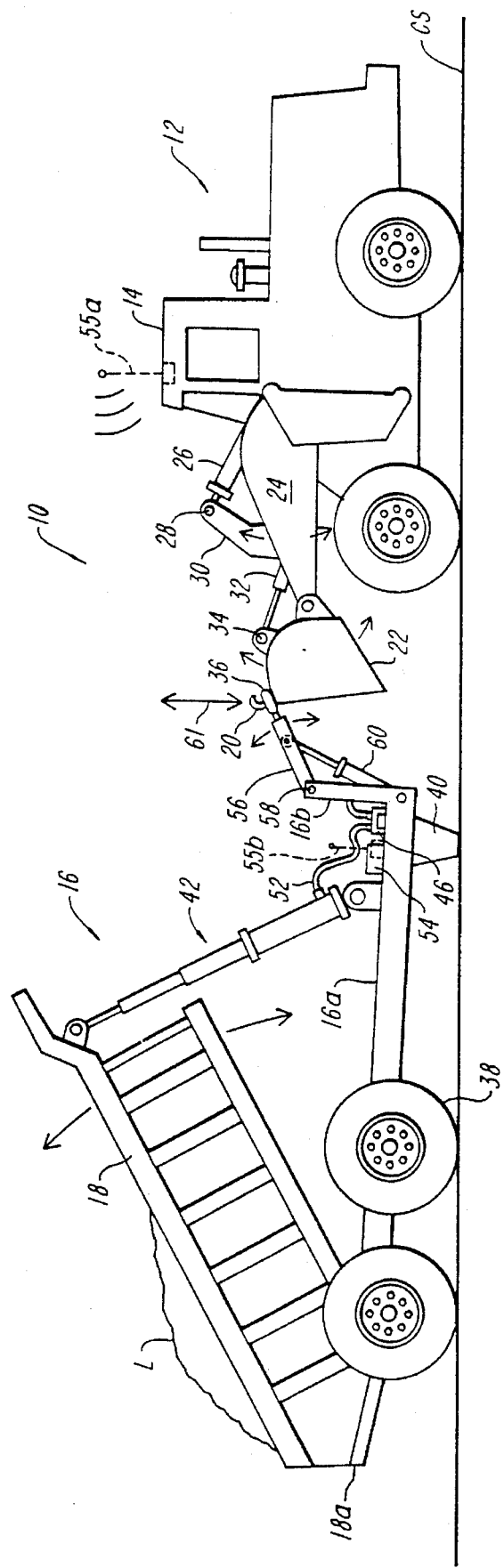
FIG. 1 is a view in side elevation of a first embodiment of a hauling system according to the present invention in a dump position and with trailer-mounted hydraulics for dumping.

With reference to FIGS. 1–4, a hauling system 10 has a self-propelled front wheel loader 12 with a cab 14 and a non self-propelled trailer 16 with a dump body 18 that can hold and carry a load L of loose bulk material such as dirt, gravel, sand or debris for movement about a construction site CS. A driver (not shown) operates the loader 12. As shown, the loader 20 is the Model 980C rubber-tired wheel loader sold by Caterpillar, Inc. of Peoria, Ill., which is modified through the addition of a hook 20 welded or otherwise secured on the "upper" wall 22a of a bucket wall 22.

While one type of wheel loader is shown herein, it will be understood that any of a wide variety of self-propelled vehicles commonly found on a construction site can be used as the tractor vehicle in the hauling system 10. Rubber-tired wheel loaders are perhaps the most common vehicle with a lifting capability, and are preferred. Back-hoes, steam shovels and plows are also possible tractors. The tractor must be 1) self-propelled, and 2) have the ability to rotate a tool, herein described as the bucket 22. The wheel loader 12 has lift arms 24,24 that raise and lower the bucket. Under control of a hydraulic cylinder 26 pivotally coupled at 28 to arms 30 connected to the lift arms 24,24. A second hydraulic cylinder 32 pivotally connected between the lift arm assembly and the bucket 22 at pivot pin 34 rotates the bucket in a vertical plane through an angular travel of about 75°—from the hook-up or engaging position shown in FIG. 3. The precise degree of the angular travel is not critical as long as it is sufficient to allow the curved hook 20 1) to engage and connect with a mating ring 36 secured to the trailer 16 and 2) then to rotate to a position where the hook-in-ring coupling is secured or locked. Reversing this rotation unlocks the connection. Mutual vertical and horizontal movement then completes the uncoupling. This arrangement thus uses the already available ability of the wheel loader to rotate a tool to lock and unlock a coupling or connection between the wheel loader and the trailer.

Connection and disconnection of the wheel loader 12 and the trailer 16 utilizes a coupling mechanism centered on the mechanical coupling of hook 20 and ring 36. The hook 20 has a generally J-shaped configuration. The ring 36 is doughnut shaped. Both are preferably formed of a rugged structural material that can be welded or otherwise very sturdily attached to the wheel loader and trailer. The hook 20 is oriented generally vertically with its free end 20a curved toward the wheel loader 12, and in the direction of rotation of the bucket 22 as it rotates from the hook up position (FIG. 2) to the locked or travel position (FIG. 3). The ring 36 has a generally horizontal orientation. The hook and ring are configured and sized so that they readily engage with a simple slip fit (FIG. 2) under control of the wheel loader operator, but once the bucket is rotated to the travel position they cannot become uncoupled through any mutual relative movement of the hook and ring. In particular, the hook tip 20a is curved for a sufficient distance, and the outer diameter of the hook and the inner diameter of the ring are sufficiently close in size, to block the passage of the ring past the tip 20a in the vertical direction, the horizontal direction towards the wheel loader, or some vector combination of those directions.

While a simple hook and ring arrangement is preferred for its low cost, ease of manipulation and reliability, other arrangements can be used. For example, the ring could be fixed on the bucket and a hook on the trailer. Whatever implementation the coupling mechanism may take, however, it should be visible directly by the operator and operable, both to connect and to disconnect, from the cab without the assistance of a second person besides the wheel loader operator, or without the operator having to exit the cab to align or manipulate the coupler. This capability has clear speed of operation, cost and safety advantages.

The trailer 16 is preferably of the general type known in the trade as a "pup" trailer. It is not self-propelled. Its center of gravity when unloaded or with a load generally centered in the dump body 18, such that there is a net moment about the wheels 38 causing the front end adjacent the wheel loader to rotate downwardly. A fixed stands 40 extends along the bottom front end of the trailer to support it when it is uncoupled from the wheel loader. A hydraulic or pneumatic jack or other supports such as lands used on highway trailers or wheeled struts can also be used, albeit at greater expense. The trailer has a dump cylinder or hoist piston 42 powered by a hydraulic circuit. A motor 44 that operates a hydraulic valve 46 connected by lines 48,48 to a hydraulic tank 50 that feeds hydraulic fluid under pressure to the hoist cylinder 42 via line 52. A battery 54 powers the motor 44. The motor 44 and valve 46 can be controlled manually or remotely from the cab, as by a wireless transmitter/receiver pair 55a,55b. Activation of the piston 42 raises the dump body as shown in FIG. 1, to dump the load over or through a gate of a rear end wall 18a.

In the preferred form, the standard pup trailer 16 is modified to mount the ring to the trailer frame 16a via a U-shaped coupling arm 56 mounted to pivot about pins 58,58. A jacking cylinder 60 is pivotally mounted between a rigid upright frame members 16b,16b and a cross beam 56a of the arm 56. Raising and lowering of the lift arms 24,24, as indicated by arrow 61, also raises and lowers the frame 56 via the hook and ring coupling. This causes the cylinder 60 to pump a hydraulic fluid via lines 62,62 through the valve body 46 to the cylinder 42 via the tank 50. The valve body 46 includes a check valve that prevents a reverse flow of the fluid to the cylinder 60 on a recovery stroke of the jacking. As can be seen in FIG. 1, to dump the load L, the hoist piston 42 is extended to lift the front end of the dump body. Ideally the pup trailer 16 is produced in a wider than standard size to enhance its stability when operated on uneven construction site terrain.

The jacking cylinder also can adjust the height of the ring 36 to facilitate hook-up with the hook 20 and freeze the frame 56 in a travel position (FIG. 3) or in a hook-up (FIG. 2) or travel (FIG. 1) position. The valve body 46 can freeze the cylinder 60, and hence the frame 56, in a preselected position. Again, while control of the valve body 46 and hence the cylinders 42 and 60, can be manual, it is also contemplated that wireless control from the cab 14 to a receiver/motor control 55b mounted on the trailer can enhance the speed and safety of the operation of the system.

Figure 8:
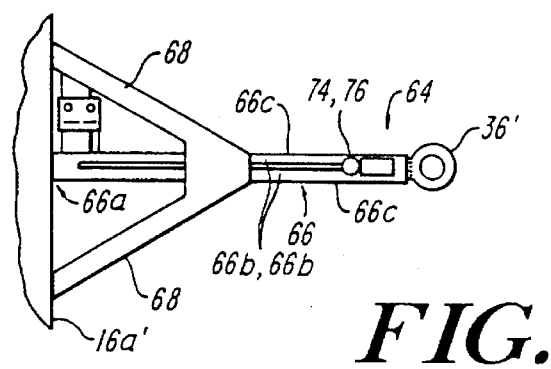
FIG. 8 is a top plan view of the cammed carriage shown in FIG. 6.

FIGS. 5–8 show an alternative form of the present invention, one using a trailer 16' (like parts in different embodiments being identified with the same reference number, but primed) where the dump body 18' is fixed on the frame 16a', and there are no hoist or jack cylinders. To dump the trailer, a carriage 64 is driven along a vertically curved track 66 secured at its end 66a to the front end of the frame 16a'. A pair of bracing members 68,68 extend from the sides of the trailer to the track (FIG. 8).

The carriage includes a vertical plate 64a that extends above and below a bottom wall 66b which has a central, longitudinal channel that receives and guides the plate 64a. The plate mounts eight freely rotatable wheels 67 arrayed in pairs on opposite sides of both halves of the carriage bottom wall. A flange 64b formed integrally with or welded to plate 64a carries the ring 36' at one end. The carriage also mounts a small electric motor 88 powered by a battery 70 connected by electrical wires 72. The motor controls the movement of a lock pin 74 mounted on the carriage with respect to a mating opening 76 in the track near its free end. As in the FIGS. 1–4 embodiment, the motor 88 may be activated remotely to enhance the speed and safety of the operation. When the pin is engaged in the opening, the carriage is locked against movement. This facilitates hook-up to the wheel loader and travel. When the lock pin is disengaged, the carriage is freely movable along the track guided by the wheels 67 engaging the bottom wall 66b. Side walls 66c,66c and end walls 66d,66d enhance the strength of the track.

The locking can be affected in a variety of alternative electro-mechanical or mechanical ways. One arrangement is to mount the lock pin on the free end a "neck" of the tracks to engage a hole on the carriage. This arrangement avoids the problem of electrical connections from a fixed battery to a moveable carriage. Also, while the motor as shown is a rotary motor that moves the pin via any well known mechanical arrangement such as gears that rotate a threaded portion of the pin, the motor can be a linear actuator such as a spring loaded pin drawn out of engagement by energizing a solenoid.

Figure 2:
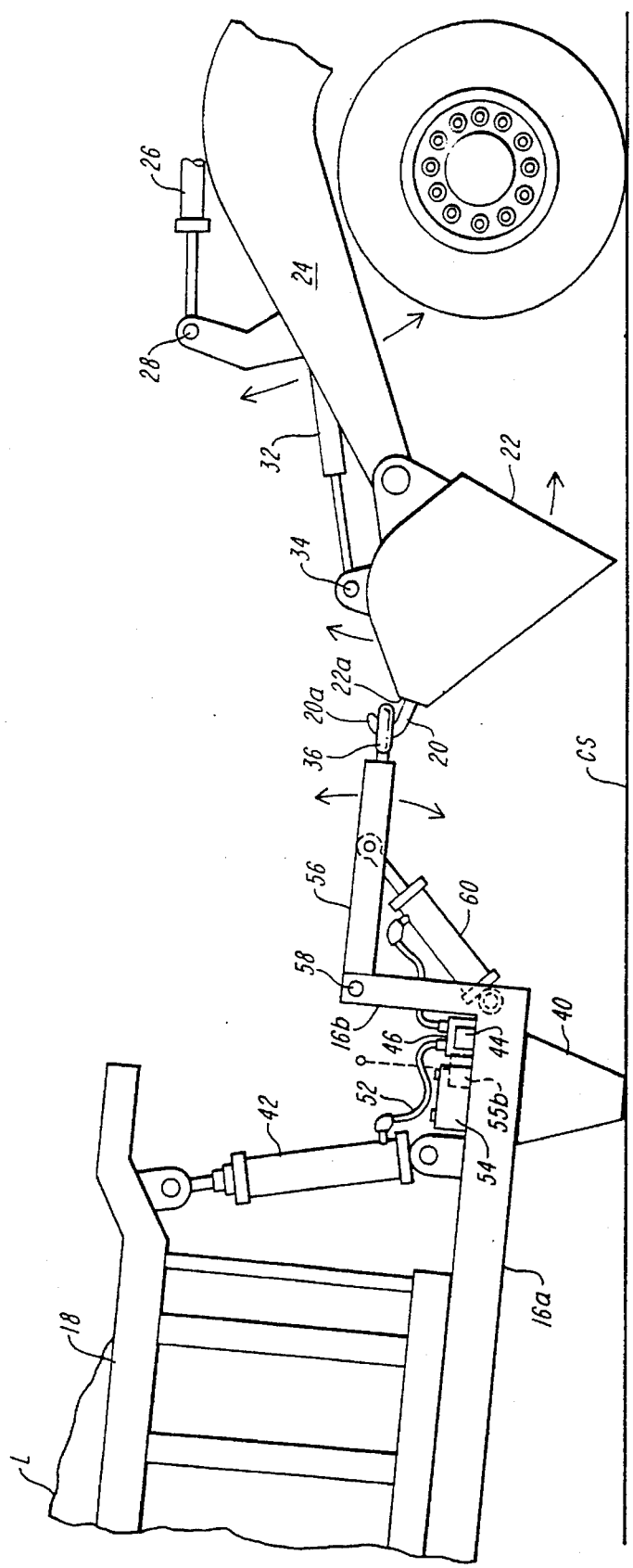
FIG. 2 is an enlarged view in side elevation of the system shown in FIG. 1, showing the connection mechanism as it first engages.
Figure 3:
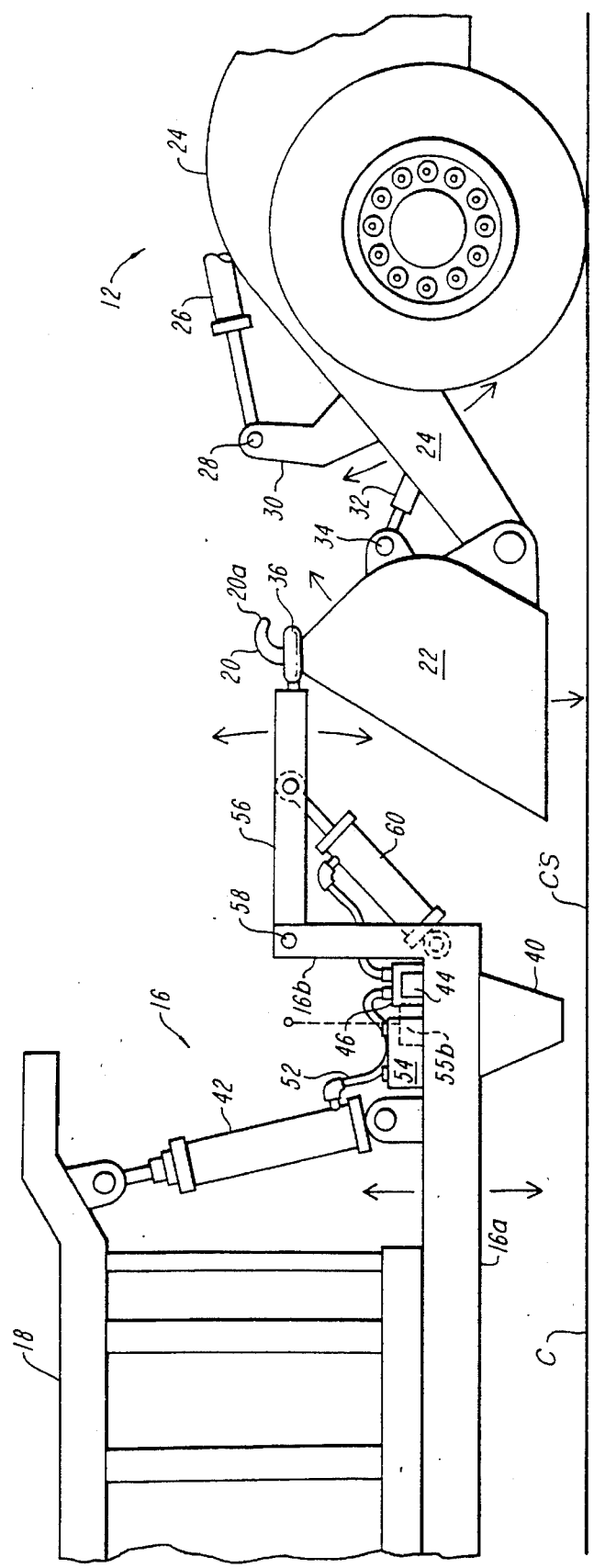
FIG. 3 is a view in side elevation of the system shown in FIGS. 1 and 2 in a traveling position.
Figure 4:
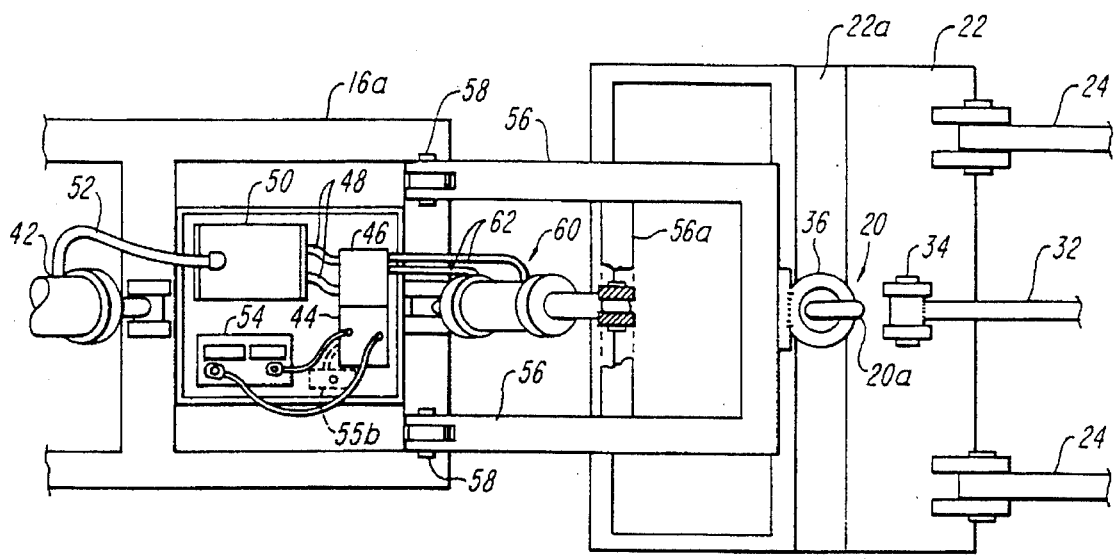
FIG. 4 is a detailed top plan view of the connection and jacking mechanisms shown in FIGS. 1–3.
Figure 6:
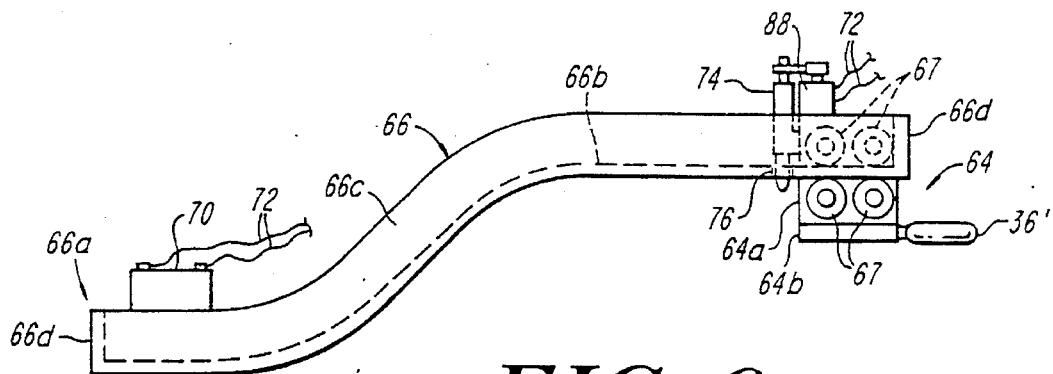
FIG. 6 is a detailed view in side elevation of the cammed carriage shown in FIG. 5.
Figure 5:
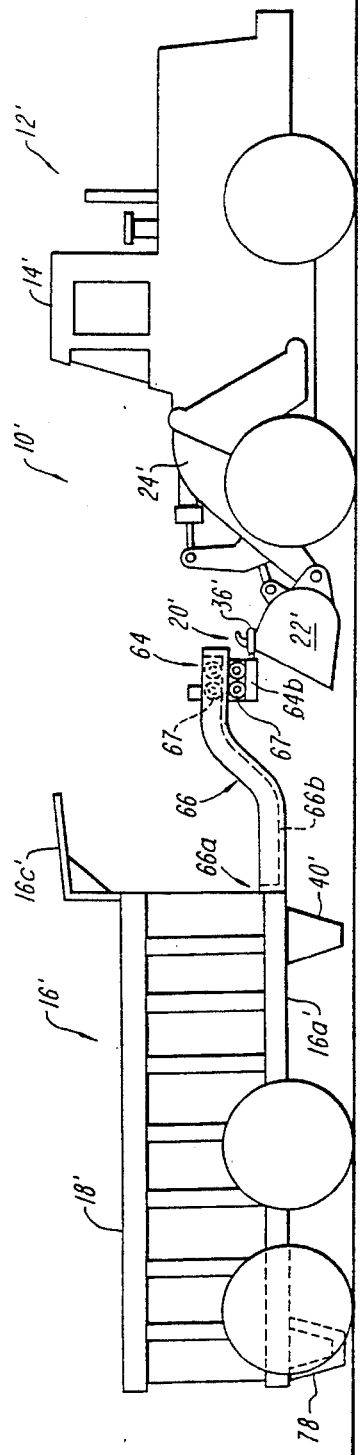
FIG. 5 is a view in side elevation of a second embodiment of a hauling system according to the present invention in an initial engagement position.
Figure 7:
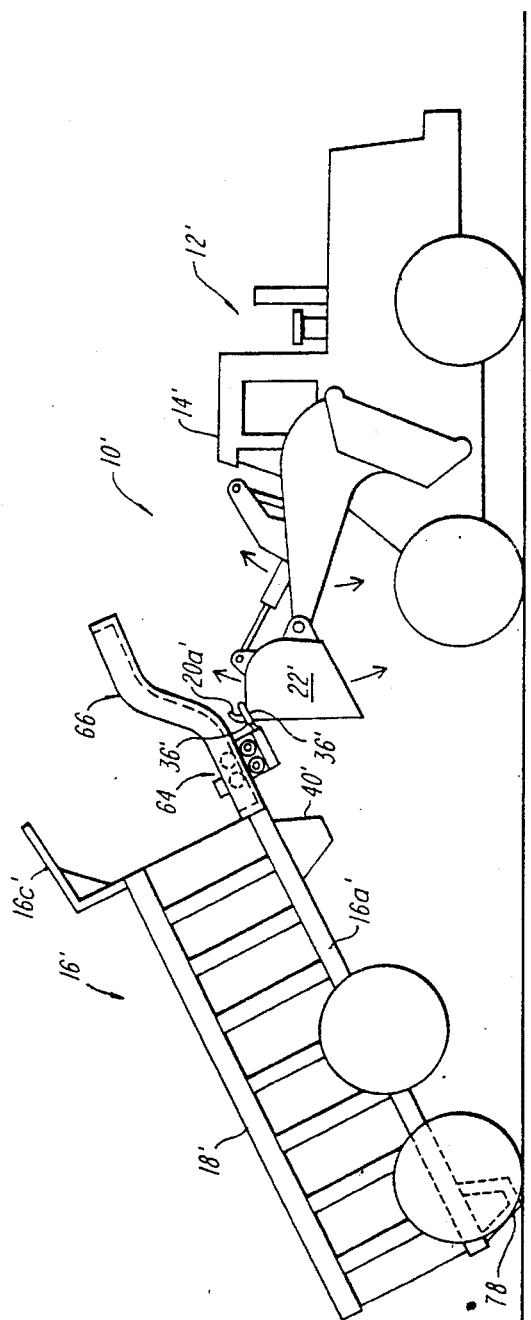
FIG. 7 is a view in side elevation corresponding to FIG. 5 showing the hauling system in a dump position.

As is best seen by comparing FIGS. 5 and 7, to hook-up the wheel loader 12', the wheel loader maneuvers the hook tip 20a' into the ring 36' (as shown in FIG. 2), and then rotates the top of its bucket 22' toward the wheel loader to lock the hook and ring coupling. The lift arms are also raised to be sure the stand 40' clears the ground. This is the travel position shown in FIG. 5. By traveling in reverse, the wheel loader drawings the trailer. By traveling in the forward direction, it pushes the trailer. The lock pin 74 is engaged in opening 76 throughout the hook-up and travel.

When the trailer is at a dump site, the wheel loader releases the lock pin, raises its lift arms 24,24 and moves toward the trailer. This causes a stake 78 that extends across the rear of the trailer and normally clears the ground to engage the ground. This blocks the trailer from rolling away from the wheel loader. The continued advance of the wheel loader toward the trailer drives the carriage 64 along the track 66. Because the track 66 is curved in the vertical plane to place its free end higher than its fixed end 66a, this travel cams the front end of the trailer upwardly. This camming action and the raising of the lift arms 24,24 results in the full dump position shown in FIG. 7. Note that some rotation of the bucket during the travel of the carriage will enhance the transmission of force from the wheel loader to the carriage by aligning the vector of the applied force with the direction of travel of the carriage as it traverses the track. As shown, the trailer 16' has a front overhang 16c' which prevents a spillover of the load from landing on the track and impeding movement of the carriage. When dumping is complete, the wheel loader is withdrawn from the trailer causing the carriage to return to the position shown in FIG. 5 where the lock pin is again engaged. The lift arms 24,24 are also lowered and the angular position of the bucket is adjusted for travel.

There has been described a hauling system particularly adapted for use on a construction site which hauls loose bulk material about the site using only one self-propelled vehicle and one operator, thereby saving the cost of a second self-propelled vehicle and its operator. The equipment for this system use standard construction site vehicles that have comparatively small modifications. The system is safe, rugged and easy to use.

While the invention has been described with reference to its preferred embodiments, it will be understood that various modifications and alterations will occur to those skilled in the art from the foregoing detailed description and the drawings. For example, while a wheel loader is shown, other self-propelled vehicles can be used. While a rotatable bucket is used to mount, maneuver and lock the connection to the trailer, other tools besides a bucket and other forms of mechanical coupling can be used. While one form of hydraulic jack and circuit are shown, other mechanical expedients for mounting the jack and using the resultant hydraulic power will be evident. These and other modifications and variations are intended to fall within the scope of the appended claims.

What is claimed is:

1. A hauling system comprising in combination:

a self-propelled construction vehicle having a cab for an operator who operates said vehicle, an articulated arm, and a tool rotatably mounted at the end of said arm for movement between first and second angular positions;

a dump trailer that is not self-propelled having a front end adjacent said tool, a frame, a dump body mounted on said frame, and hoist means for raising the front end of said dump body from said frame; and connecting means for releasably securing said vehicle to said trailer, said connecting means comprising a first connecting member secured to said tool at a location which does not interfere with the normal use of said tool and a second connecting member secured to the front of said trailer, said first and second members being sized to couple to one another when said vehicle positions them in a mutually aligned engagement position;

said first and second connecting members being structured and mutually positioned such that they are unlocked when said tool is in said first angular position and locked in said engagement when said tool is in said second angular position;

and said hoist means comprising a hydraulic jack operably connected to an articulated member of said trailer that mounts said second connecting member so that when said first and second connecting members are coupled, reciprocation of said articulated arm pumps said jack.

2. A hauling system according to claim 1, wherein said first connecting member comprises a hook with one end being a tip portion curved toward said vehicle and said second connecting member comprises a ring through which said tip portion fits to couple said first and second connection members to one another.

3. A hauling system according to claim 2, wherein said tip portion of said hook extends in a generally vertical direction when said tool is in said first angular position and said ring is positioned generally horizontally.

4. A hauling system according to claim 1, wherein said vehicle is a wheel loader, said tool is a bucket and said arm is a lift arm that rotatably mounts said bucket at its free end.

* * * * *